US008204639B2

(12) United States Patent
Jinno et al.

(10) Patent No.: US 8,204,639 B2
(45) Date of Patent: Jun. 19, 2012

(54) HYBRID VEHICLE AND CONTROL METHOD THEREOF

(75) Inventors: Kunihiko Jinno, Toyota (JP); Tadashi Nakagawa, Nishikamo-gun (JP); Masahiko Maeda, Nagoya (JP); Hideaki Yaguchi, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 459 days.

(21) Appl. No.: 12/520,928

(22) PCT Filed: Oct. 25, 2007

(86) PCT No.: PCT/JP2007/070790
§ 371 (c)(1),
(2), (4) Date: Jun. 23, 2009

(87) PCT Pub. No.: WO2008/081642
PCT Pub. Date: Jul. 10, 2008

(65) Prior Publication Data
US 2010/0138090 A1 Jun. 3, 2010

(30) Foreign Application Priority Data

Dec. 28, 2006 (JP) ................................ 2006-356259

(51) Int. Cl.
*B60L 9/00* (2006.01)
(52) U.S. Cl. ............... 701/22; 701/102; 180/65.265; 477/107

(58) Field of Classification Search ............... 701/22, 701/102; 180/65.265
See application file for complete search history.

(56) References Cited

U.S. PATENT DOCUMENTS

| 6,073,456 A * | 6/2000 | Kawai et al. ............ 62/133 |
| 6,443,126 B1* | 9/2002 | Morimoto et al. ....... 123/339.15 |
| 7,632,212 B2* | 12/2009 | Yamanaka et al. ............ 477/107 |
| 2006/0260853 A1* | 11/2006 | Ando et al. ................ 180/65.3 |
| 2009/0088913 A1* | 4/2009 | Oyama et al. .................. 701/22 |

FOREIGN PATENT DOCUMENTS

| DE | 10047969 A1 | 5/2001 |
| EP | 0990793 B1 | 4/2000 |
| EP | 1127730 B1 | 8/2001 |
| JP | 10-248106 A | 9/1998 |
| JP | 11-180137 A | 7/1999 |
| JP | 2000-008902 A | 1/2000 |
| JP | 2001-098966 A | 4/2001 |
| JP | 2006-151039 A | 6/2006 |
| JP | 2006-321466 A | 11/2006 |

* cited by examiner

*Primary Examiner* — Behrang Badii
*Assistant Examiner* — Shardul Patel
(74) *Attorney, Agent, or Firm* — Sughrue Mion, PLLC (57) ABSTRACT

In a hybrid vehicle 20, an engine 22, motors MG1 and MG2 are controlled so that the engine 22 is operated at a target operation point set at Step 120 based on a torque demand Tr* and the motor MG2 outputs lower power for driving in comparison with a turn-off condition of an ECO switch 88 when the ECO switch 88 is turned on upon driving with power from both the engine 22 and the motor MG2 (Steps S130-S150 and S170-S200).

12 Claims, 9 Drawing Sheets

HYBRID VEHICLE AND CONTROL METHOD THEREOF

CROSS REFERENCE TO RELATED APPLICATION

This application is a National Stage of International Application No. PCT/JP2007/070790 filed Oct. 25, 2007, claiming priority based on Japanese Patent Application No. 2006-356259, filed Dec. 28, 2006, the contents of all of which are incorporated herein by reference in their entirety.

TECHNICAL FIELD

The present invention relates to a hybrid vehicle and a control method thereof. In particularly, the present invention relates to a hybrid vehicle capable of driving with power from an internal combustion engine and a motor and to a control method of the hybrid vehicle.

BACKGROUND ART

Conventionally, there is well-known an electric vehicle capable of selecting between a high output mode and a low output mode by an operation of a mode selection switch (for example, refer to Patent Document 1). In the electric vehicle, when real acceleration becomes lower than required acceleration at a prescribed rate due to shortage of an output of a running motor during driving in the low output mode, the output of the running motor is increased so as not to exceed the output in the high output mode. Also, there is known a vehicle equipped with an internal combustion engine as a driving source and having a normal mode and an energy saving mode as modes of an operation (for example, refer to Patent Document 2). With respect to the same predetermined output of an accelerator position sensor, in the vehicle, a supply of fuel to the internal combustion engine during selection of the energy saving mode is decreased in comparison with a supply of fuel during selection of the normal mode.

[Patent Document 1] Japanese Patent Laid-Open No. 10-248106
[Patent Document 2] Japanese Patent Laid-Open No. 2006-151039 (FIG. 8)

DISCLOSURE OF THE INVENTION

Recently, a hybrid vehicle capable of driving with power from an internal combustion engine and a motor becomes more widespread in popularity. The mode selection switch may be applied to the hybrid vehicle so as to allow to change from the normal mode to the low output mode or the energy saving mode giving priority to energy efficiency, thereby improving the energy efficiency of the hybrid vehicle. However, above patent documents do not disclose how to control the hybrid vehicle during selection of the mode giving priority to energy efficiency.

The present invention has a main object to provide a hybrid vehicle capable of driving with power from an internal combustion engine and a motor and appropriately controlling the internal combustion engine and the motor so as to improve energy efficiency during selection of the efficiency priority mode.

The present invention accomplishes the demand mentioned above by the following configurations applied to a hybrid vehicle and a control method thereof.

The present invention is directed to a hybrid vehicle including: an internal combustion engine capable of outputting power for driving; a motor capable of outputting power for driving; an accumulator capable of supplying and receiving electric power from the motor; an efficiency priority mode selection switch to select an efficiency priority mode that gives priority to energy efficiency; a driving force demand setting module configured to set a driving force demand required for driving the hybrid vehicle; a target operation point setting module configured to set a target operation point of the internal combustion engine based on the set driving force demand; and a control module configured to control the internal combustion engine and the motor so that the internal combustion engine is operated at the set target operation point and a driving power equivalent to the set driving force demand is ensured when the efficiency priority mode selection switch is turned off upon driving with power from both the internal combustion engine and the motor, the control module controlling the internal combustion engine and the motor so that the internal combustion engine is operated at the set target operation point and the motor outputs lower power for driving in comparison with a turn-off condition of the efficiency priority mode selection switch when the efficiency priority mode selection switch is turned on upon driving with power from both the internal combustion engine and the motor.

In the hybrid vehicle, when the efficiency priority mode selection switch is turned off upon driving with power from both the internal combustion engine and the motor, the internal combustion engine and the motor are controlled so that the internal combustion engine is operated at the target operation point set based on the driving force demand required for driving the hybrid vehicle and the driving power equivalent to the driving force demand is ensured. When the efficiency priority mode selection switch is turned on upon driving with power from both the internal combustion engine and the motor, the internal combustion engine and the motor are controlled so that the internal combustion engine is operated at the target operation point set based on the driving force demand and the motor outputs lower power for driving in comparison with the turn-off condition of the efficiency priority mode selection switch. By decreasing the power from the motor in comparison with the turn-off condition of the efficiency priority mode selection switch when the efficiency priority mode is selected upon driving with power from both the internal combustion engine and the motor, the power for driving becomes slightly lower than that of the turn-off condition of the efficiency priority mode selection switch, however, energy efficiency of the vehicle can be improved by reductions of electric power consumption of the motor and losses of the motor and the like. If decreasing the output of the internal combustion engine when the efficiency priority mode selection switch is turned on upon driving with power from both the internal combustion engine and the motor, efficiency of the internal combustion engine may be contrarily decreased. Therefore, in the hybrid vehicle, a target operation point corresponding to a certain driving force demand is set to a same value irrespective of operational conditions of the efficiency priority mode selection switch, so that the efficiency of the internal combustion engine can be prevented from decreasing. Accordingly, in the hybrid vehicle, the internal combustion engine and the motor are appropriately controlled so as to improve energy efficiency during selection of the efficiency priority mode.

The control module may set a torque command value for the motor to be smaller by a predetermined amount than that of the turn-off condition of the efficiency priority mode selection switch when the efficiency priority mode selection switch is turned on upon driving with power from both the internal combustion engine and the motor.

The above hybrid vehicle may include a power transmitting mechanism having an axle-side rotational element connected to a predetermined axle, and an engine-side rotational element connected to an engine shaft of the internal combustion engine and configured to differentially rotate with respect to the axle-side rotational element, the power transmitting mechanism capable of outputting at least a part of power from the engine shaft to the axle side. In this case, the power transmitting mechanism may be an electric power-mechanical power input output structure connected to the predetermined axle and the engine shaft of the internal combustion engine and outputting at least a part of power from the internal combustion engine to the axle side with input/output of electric power and mechanical power, the electric power-mechanical power input output structure supplying and receiving electric power from the accumulator.

The electric power-mechanical power input output structure may include a power generation motor capable of inputting and outputting power, and a three shaft-type power input output assembly connected with three shafts, the predetermined axle, the engine shaft of the internal combustion engine, and a rotating shaft of the power generation motor, the three shaft-type power input output assembly configured to input and output power to one remaining shaft, based on input and output of powers from and to any two shafts selected among the three shafts. In this case, the control module may set a torque command value for the motor so that electric power supplied to the motor from the accumulator becomes smaller by a predetermined rate than that of the turn-off condition of the efficiency priority mode selection switch when the efficiency priority mode selection switch is turned on upon driving with power from both the internal combustion engine and the motor. That is, in the hybrid vehicle capable of adjusting the balance of the electric power between the motor and the power generation motor, energy efficiency of the vehicle can be improved by reductions of electric power consumption of the motor and losses of the motor and the like by setting the torque command value for the motor so that electric power supplied to the motor from the accumulator becomes smaller by the predetermined rate than that of the turn-off condition of the efficiency priority mode selection switch when the efficiency priority mode selection switch is turned on upon driving the motor with electric power from the accumulator.

The power transmitting mechanism may be a continuously variable transmission.

Further, the present invention is directed to a control method of a hybrid vehicle including an internal combustion engine capable of outputting power for driving, a motor capable of outputting power for driving, an accumulator capable of supplying and receiving electric power from the motor, and an efficiency priority mode selection switch to select an efficiency priority mode that gives priority to energy efficiency, the method including the steps of:

(a) setting a target operation point of the internal combustion engine based on a driving force demand required for driving the hybrid vehicle; and (b) controlling the internal combustion engine and the motor so that the internal combustion engine is operated at the target operation point set at the step (a) and a driving power equivalent to the set driving force demand is ensured when the efficiency priority mode selection switch is turned off upon driving with power from both the internal combustion engine and the motor, and controlling the internal combustion engine and the motor so that the internal combustion engine is operated at the target operation point set at the step (a) and the motor outputs lower power for driving in comparison with a turn-off condition of the efficiency priority mode selection switch when the efficiency priority mode selection switch is turned on upon driving with power from both the internal combustion engine and the motor.

As the control method, by decreasing the power from the motor in comparison with the turn-off condition of the efficiency priority mode selection switch when the efficiency priority mode is selected upon driving with power from both the internal combustion engine and the motor, the power for driving becomes slightly lower than that of the turn-off condition of the efficiency priority mode selection switch, however, energy efficiency of the vehicle can be improved by reductions of electric power consumption of the motor and losses of the motor and the like. If decreasing the output of the internal combustion engine when the efficiency priority mode selection switch is turned on upon driving with power from both the internal combustion engine and the motor, efficiency of the internal combustion engine may be contrarily decreased. Therefore, in the control method, a target operation point corresponding to a certain driving force demand is set to a same value irrespective of operational conditions of the efficiency priority mode selection switch, so that the efficiency of the internal combustion engine can be prevented from decreasing. Accordingly, in the control method, the internal combustion engine and the motor are appropriately controlled so as to improve energy efficiency during selection of the efficiency priority mode.

The step (b) may set a torque command value for the motor to be smaller by a predetermined amount than that of the turn-off condition of the efficiency priority mode selection switch when the efficiency priority mode selection switch is turned on upon driving with power from both the internal combustion engine and the motor. The hybrid vehicle may further include a power transmitting mechanism having an axle-side rotational element connected to a predetermined axle, and an engine-side rotational element connected to an engine shaft of the internal combustion engine and configured to differentially rotate with respect to the axle-side rotational element, the power transmitting mechanism capable of outputting at least a part of power from the engine shaft to the axle side. In this case, the power transmitting mechanism may be an electric power-mechanical power input output structure connected to the predetermined axle and the engine shaft of the internal combustion engine and outputting at least a part of power from the internal combustion engine to the axle side with input/output of electric power and mechanical power, the electric power-mechanical power input output structure supplying and receiving electric power from the accumulator. The electric power-mechanical power input output structure may include a power generation motor capable of inputting and outputting power, and a three shaft-type power input output assembly connected with three shafts, the predetermined axle, the engine shaft of the internal combustion engine, and a rotating shaft of the power generation motor, the three shaft-type power input output assembly configured to input and output power to one remaining shaft, based on input and output of powers from and to any two shafts selected among the three shafts. In this case, the step (b) may set a torque command value for the motor so that electric power supplied to the motor from the accumulator becomes smaller by a predetermined rate than that of the turn-off condition of the efficiency priority mode selection switch when the efficiency priority mode selection switch is turned on upon driving with power from both the internal combustion engine and the motor. Also, in the control method, the power transmitting mechanism may be a continuously variable transmission.

BEST MODES OF CARRYING OUT THE INVENTION

Now, the best mode for carrying out the present invention will be described with reference to an embodiment.

First Embodiment

Figure 1:
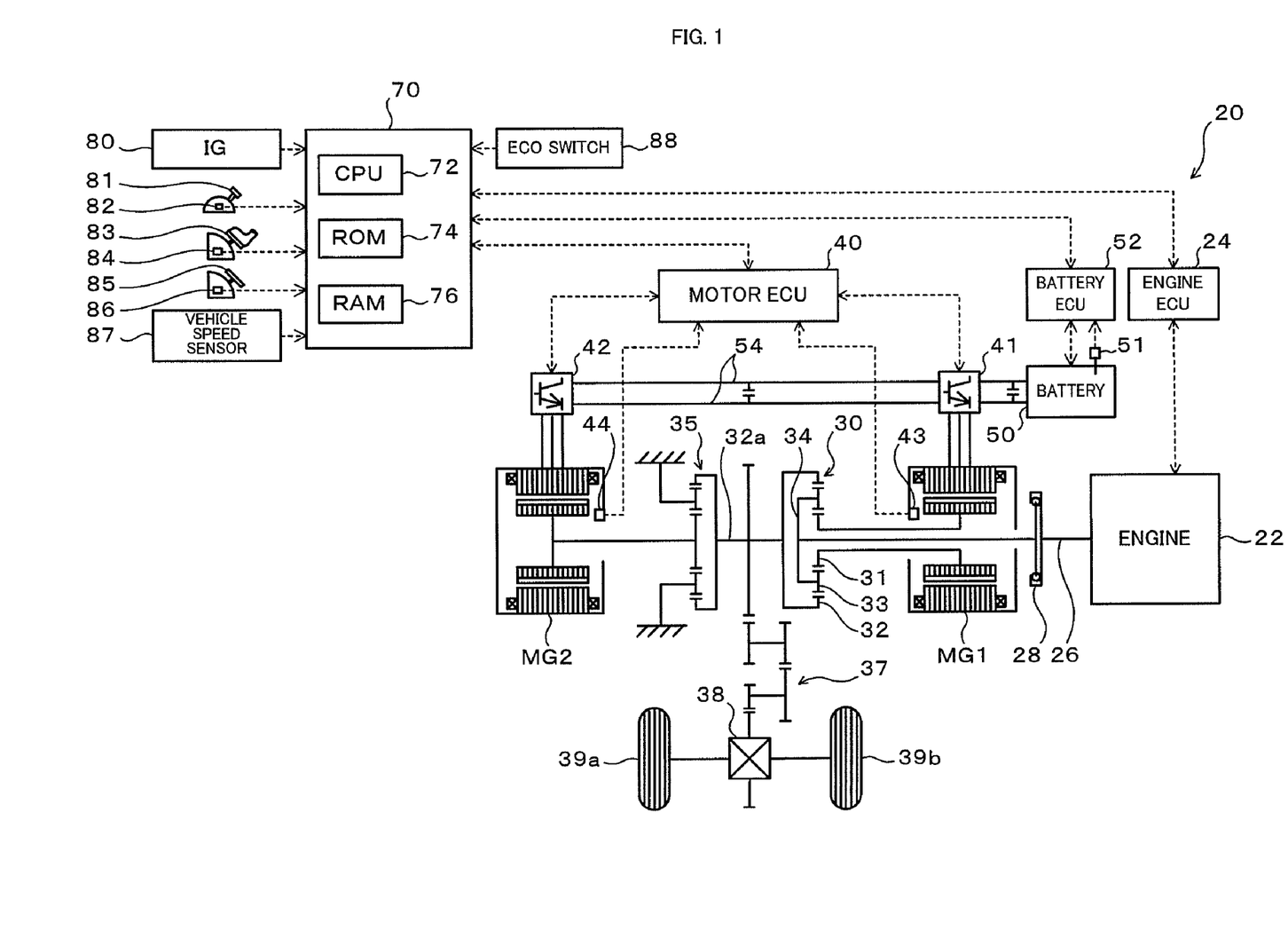
FIG. 1 is a schematic block diagram of a hybrid vehicle 20 according to a first embodiment of the present invention.

FIG. 1 schematically illustrates the configuration of a hybrid vehicle 20 in a first embodiment of the invention. The hybrid vehicle 20 of the illustrated configuration includes an engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a as an axle connected to the power distribution integration mechanism 30, a motor MG2 connected to the ring gear shaft 32a via the reduction gear 35, and a hybrid electronic control unit 70 (hereinafter referred to as "hybrid ECU") configured to control the operations of the whole hybrid vehicle 20.

The engine 22 is constructed as an internal combustion engine designed to consume a hydrocarbon fuel, such as gasoline or light oil, and thereby generate power. The engine 22 is under operation controls, such as fuel injection control, ignition timing control, and intake air flow control, of an engine electronic control unit 24 (hereinafter referred to as "engine ECU"). The engine ECU 24 inputs diverse signals from various sensors mounted on the engine 22 to measure and detect the operating conditions of the engine 22. The engine ECU 24 establishes communication with the hybrid ECU 70 to control the operations of the engine 22 in response to control signals from the hybrid ECU 70 and with reference to the diverse signals from the various sensors and to output data regarding the operating conditions of the engine 22 to the hybrid ECU 70 according to the requirements.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 as the rotational elements of differential motions. The carrier 34 as an engine-side rotational element, the sun gear 31, and the ring gear 32 as an axle-side rotational element in the power distribution integration mechanism 30 are respectively connected to the crankshaft 26 of the engine 22, to the motor MG1, and to the reduction gear 35 via the ring gear shaft 32a. When the motor MG1 functions as a generator, the power distribution integration mechanism 30 distributes the power of the engine 22 input via the carrier 34 into the sun gear 31 and the ring gear 32 corresponding to their gear ratio. When the motor MG1 functions as a motor, on the other hand, the power distribution integration mechanism 30 integrates the power of the engine 22 input via the carrier 34 with the power of the motor MG1 input via the sun gear 31 and outputs the integrated power to the ring gear 32. The power output to the ring gear 32 is transmitted from the ring gear shaft 32a through a gear mechanism 37 and a differential gear 38 and is eventually output to drive wheels 39a and 39b of the hybrid vehicle 20. The motors MG1 and MG2 are constructed as known synchronous motor generators to enable operations as both a generator and a motor. The motors MG1 and MG2 receive and supply electric power to a battery 50 as a secondary cell via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit 40 (hereinafter referred to as "motor ECU"). The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 also computes rotational speeds Nm1 and Nm2 of the rotors in the motors MG1 and MG2 according to a rotational speed computation routine (not shown) based on the output signals of the rotational position detection sensors 43 and 44. The motor ECU 40 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

The battery 50 is under control and management of a battery electronic control unit 52 (hereinafter referred to as "battery ECU"). The battery ECU 52 inputs various signals required for management and control of the battery 50, for example, an inter-terminal voltage from a voltage sensor (not shown) located between terminals of the battery 50, a charge-discharge current from a current sensor (not shown) located in the power line 54 connecting with the output terminal of the battery 50, and a battery temperature Tb from a temperature sensor 51 attached to the battery 50. The battery ECU 52 outputs data regarding the operating conditions of the battery 50 by data communication to the hybrid ECU 70 and the engine ECU 24 according to the requirements. The battery ECU 52 also executes various arithmetic operations for management and control of the battery 50. A remaining capacity or state of charge SOC of the battery 50 is calculated from an integrated value of the charge-discharge current measured by the current sensor.

The hybrid ECU 70 is constructed as a microprocessor including a CPU 72, a ROM 74 configured to store processing programs, a RAM 76 configured to temporarily store data, input and output ports (not shown), and a communication port (not shown). The hybrid ECU 70 inputs, via its input port, an ignition signal from an ignition switch (start switch) 80, a shift position SP or a current setting position of a shift lever 81 from a shift position sensor 82, an accelerator opening Acc or the driver's depression amount of an accelerator pedal 83 from an accelerator pedal position sensor 84, a brake pedal stroke BS or the driver's depression amount of a brake pedal 85 from a brake pedal stroke sensor 86, and a vehicle speed V from a vehicle speed sensor 87. An ECO switch (efficiency priority mode selection switch) 88 to select, as a control mode at a time of driving, an ECO mode (efficiency priority mode) that gives priority to energy efficiency such as fuel consumption over drivability is disposed in the vicinity of the driver's seat of the hybrid vehicle 20 of the present embodiment. The ECO switch 88 is also connected to the hybrid ECU 70. When the ECO switch 88 is turned on by the driver or the like, a predetermined ECO flag Feco that is set to value "0" during normal operation (when the ECO switch 88 is turned off) is set to value "1", and the hybrid vehicle 20 is controlled according to various control procedures that are previously defined to give priority to efficiency. As described above, the hybrid ECU 70 is connected via the communication port with the engine ECU 24, the motor ECU 40, the battery ECU 52, and the like, and exchanges various control signals and data with the engine ECU 24, the motor ECU 40, the battery ECU 52, and the like.

Figure 2:
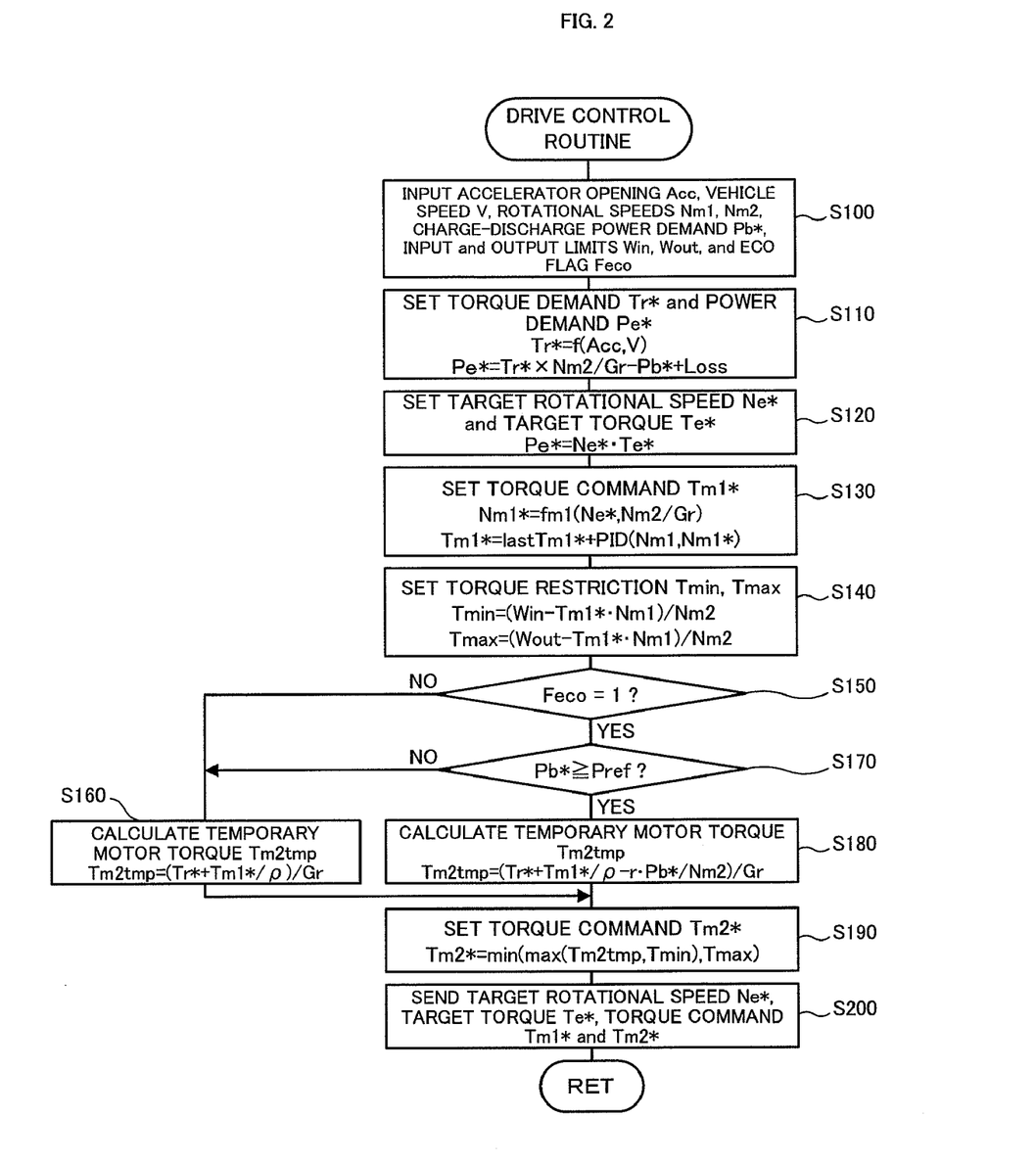
FIG. 2 is a flowchart illustrating an example of a drive control routine executed by a hybrid electric control unit 70 in the first embodiment.

The hybrid vehicle 20 of the first embodiment constructed as described above sets a torque demand, which is to be output to the ring gear shaft 32a or the driveshaft linked with an axle of the hybrid vehicle 20, based on the vehicle speed V and the accelerator opening Acc corresponding to the driver's depression amount of the accelerator pedal 83, and controls the operations of the engine 22, the motors MG1 and MG2 to ensure output of power equivalent to the set torque demand to the ring gear shaft 32a. There are several drive control modes of the engine 22, the motors MG1 and MG2. In a torque conversion drive mode, while the engine 22 is driven and controlled to ensure output of the power equivalent to the torque demand, the motors MG1 and MG2 are driven and controlled to enable all the output power of the engine 22 to be subjected to torque conversion by the power distribution integration mechanism 30, the motors MG1 and MG2 and to be output to the ring gear shaft 32a. In a charge-discharge drive mode, the engine 22 is driven and controlled to ensure output of power corresponding to the sum of a power demand and electric power required for charging the battery 50 or electric power to be discharged from the battery 50. The motors MG1 and MG2 are driven and controlled to enable all or part of the output power of the engine 22 with charge or discharge of the battery 50 to be subjected to torque conversion by the power distribution integration mechanism 30, the motors MG1 and MG2 and to ensure output of the power demand to the ring gear shaft 32a. In a motor drive mode, the motor MG2 is driven and controlled to ensure output of power equivalent to the power demand to the ring gear shaft 32a, while the engine 22 stops its operation. Next, the operation of the hybrid vehicle 20 with the above configuration will be described. FIG. 2 is a flowchart illustrating an example of a drive control routine that is executed by the hybrid ECU 70 at predetermined time intervals (for example, at ever several msec).

Figure 3:
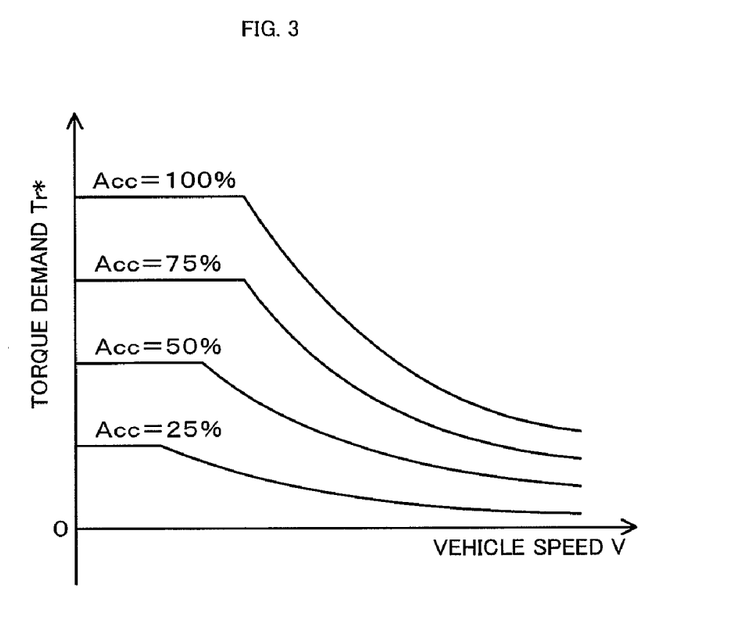
FIG. 3 is a view illustrating an example of a torque demand setting map.
Figure 4:
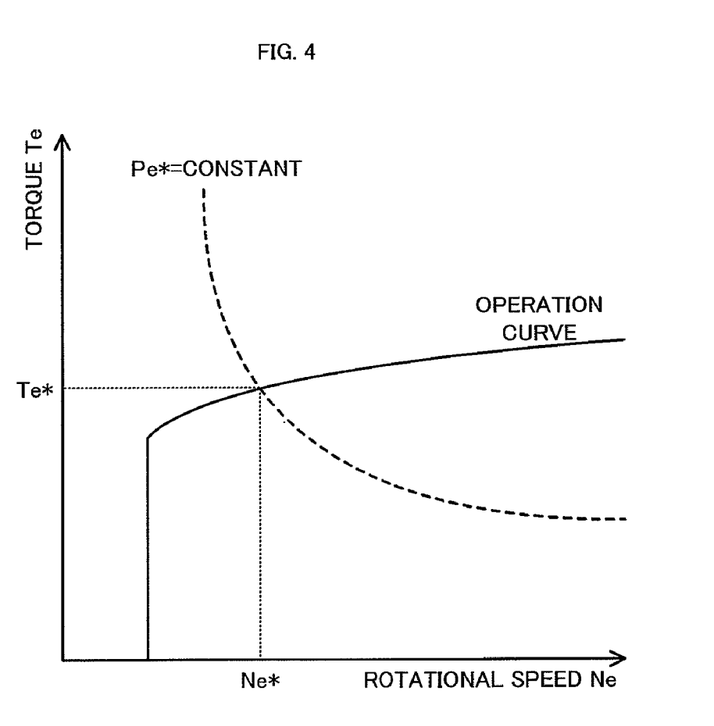
FIG. 4 is a view illustrating an operation curve of the engine 22 and a correlation curve between a target rotational speed Ne* and a target torque Te*.

At start of the drive control routine in FIG. 2, the CPU 72 of the hybrid ECU 70 executes input processing of data required for control such as the accelerator opening Acc from the accelerator pedal position sensor 84, the vehicle speed V from the vehicle speed sensor 87, the rotational speeds Nm1, Nm2 of the motors MG1, MG2, a charge-discharge power demand Pb*, an input limit Win that is an allowable charging electric power to be charged into the battery 50 and an output limit Wout that is an allowable discharging electric power to be discharged from the battery 50, and a value of the ECO flag Feco (Step S100). The rotational speeds Nm1 and Nm2 of the motors MG1 and MG2 are input from the motor ECU 40 by communication. The charge-discharge power demand Pb* is set as electric power for charging or discharging the battery 50 according to the state of charge SOC of the battery 50 and the like by the battery ECU 52 and is input from the battery ECU 52 by communication. The input limit Win and the output limit Wout are set based on the battery temperature Tb of the battery 50 and the state of charge SOC of the battery 50 and are input from the battery ECU 52 by communication. After the data input at Step S100, the CPU 72 sets a torque demand Tr* to be output to the ring gear shaft 32a or the axle connected to drive wheels 39a and 39b based on the input accelerator opening Acc and the input vehicle speed V, and sets a power demand Pe* required for the engine 22 (Step S110). In the embodiment, the torque demand Tr* corresponding to the given accelerator opening Acc and the given vehicle speed V is derived from a torque demand setting map previously stored in the ROM 74 and defining a relationship between the accelerator opening Acc, the vehicle speed V and the torque demand Tr*. FIG. 3 illustrates an example of the torque demand setting map. In the embodiment, the power demand Pe* is calculated as the sum of a product of the set torque demand Tr* and a rotational speed Nr of the ring gear shaft 32a, the charge-discharge power demand Pb* (where positive values represent discharge demands), and a potential loss. The rotational speed Nr of the ring gear shaft 32a is obtained by dividing the rotational speed Nm2 of the motor MG2 by a gear ratio Gr of the reduction gear 35 or by multiplying the vehicle speed V by a predetermined conversion factor k. Then, the CPU 72 sets a target rotational speed Ne* and a target torque Te* as a target drive point of the engine 22 so that the engine 22 is operated with high efficiency, based on the power demand Pe* set at Step S110 (Step S120). In the embodiment, the target rotational speed Ne* and the target torque Te* of the engine 22 are set based on a predetermined operation curve for operating the engine 22 with high efficiency and the power demand Pe*. FIG. 4 illustrates the operation curve of the engine 22 and a correlation curve between the target rotational speed Ne* and the target torque Te*. As shown in FIG. 4, the target rotational speed Ne* and the target torque Te* can be obtained from an intersection between the operation curve and the correlation curve indicating a constant power demand Pe* (Ne*×Te*).

Figure 5:
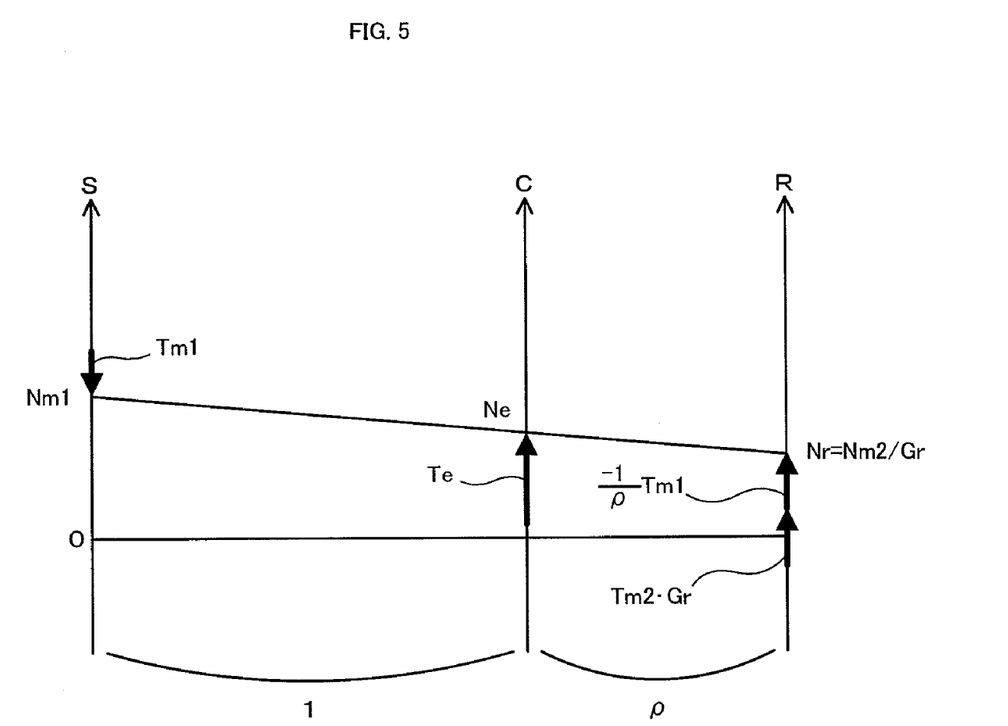
FIG. 5 is a view illustrating an alignment chart showing a dynamic relationship between a rotational speed and torque of each rotating element of a power distribution and integration mechanism 30.

After setting the target rotational speed Ne* and the target torque Te* of the engine 22, the CPU 72 calculates a target rotational speed Nm1* of the motor MG1 from the set target rotational speed Ne*, the rotational speed Nr (=Nm2/Gr) of the ring gear shaft 32a, and a gear ratio ρ of the power distribution integration mechanism 30 (a quotient of the number of teeth of the sun gear 31 by the number of teeth of the ring gear 32) according to Equation (1) given below. Then, CPU 72 computes a torque command Tm1* of the motor MG1 by calculation of below Equation (2) based on the calculated target rotational speed Nm1* and a current rotational speed Nm1 of the motor MG1 (Step S130). Equation (1) is a dynamic relational expression of respective rotational elements included in the power distribution integration mechanism 30. FIG. 5 illustrates an alignment chart showing torque-rotational speed dynamics of the respective rotational elements included in the power distribution integration mechanism 30. In FIG. 5, the left axis 'S' represents a rotational speed of the sun gear 31 that is equivalent to the rotational speed Nm1 of the motor MG1, the middle axis 'C' represents a rotational speed of the carrier 34 that is equivalent to the rotational speed Ne of the engine 22, and the right axis 'R' represents the rotational speed Nr of the ring gear 32 obtained by dividing the rotational speed Nm2 of the motor MG2 by the gear ratio Gr of the reduction gear 35. Two thick arrows on the axis 'R' respectively show torque applied to the ring gear shaft 32a by output of the torque Tm1 from the motor MG1, and torque applied to the ring gear shaft 32a via the reduction gear 35 by output of the torque Tm2 from the motor MG2. Equation (1) for computation of the target rotational speed Nm1* of the motor MG1 is readily obtained by taking into account the rotational speed relation in the alignment chart. Equation (2) is a relational expression of feedback control to drive and rotate the motor MG1 at the target rotational speed Nm1*. In Equation (2) given above, 'k1' in the second term and 'k2' in the third term on the right side respectively denote a gain of the proportional and a gain of the integral term. After computation of the torque command Tm1* of the motor MG1 at Step S130, the CPU 72 calculates a lower torque restriction Tmin and an upper torque restriction Tmax as allowable minimum and maximum torques to be output from the motor MG2 according to the following equations (3) and (4) by dividing a deviation between the output limit Wout or the input limit Win of the battery 50 and power consumption of the motor MG1 that is a product of the torque command Tm1* and the current rotational speed Nm1 of the motor MG1 by the rotational speed Nm2 of the motor MG2 (Step S140).

$$Nm1^* = Ne^* \cdot (1+\rho)/\rho - Nm2/(Gr \cdot \rho) \quad (1)$$

$$Tm1^* = \text{last } Tm1^* + k1(Nm1^* - Nm1) + k2\int(Nm1^* - Nm1)dt \quad (2)$$

$$Tmin = (Win - Tm1^* \cdot Nm1)/Nm2 \quad (3)$$

$$Tmax = (Wout - Tm1^* \cdot Nm1)/Nm2 \quad (4)$$

Then, the CPU 72 determines whether or not the value of the ECO flag Feco input at Step S100 is value "1", that is, whether or not the ECO switch 88 is turned on by the driver or the like (Step S150). When the ECO switch 88 is turned off and the value of the ECO flag Feco is value "0", the CPU 72 calculates a temporary motor torque Tm2tmp as a torque value to be output from the motor MG2, based on the torque demand Tr*, the torque command Tm1*, the gear ratio ρ of the power distribution integration mechanism 30, and the gear ratio Gr of the reduction gear 35 according to Equation (5) given below (Step S160). Then, the CPU 72 sets a torque command Tm2* of the motor MG2 to a value obtained by limiting the calculated temporary motor torque Tm2tmp by the lower and the upper torque restrictions Tmin and Tmax (Step S190). Setting the torque command Tm2* of the motor MG2 in this manner restricts the torque to be output to the ring gear shaft 32a or the axle in the range of the input limit Win and the output limit Wout of the battery 50. Equation (5) is readily introduced from the alignment chart of FIG. 5. After setting the target rotational speed Ne* and the target torque Te* of the engine 22 and the torque commands Tm1* and Tm2* of the motors MG1 and MG2, the CPU 72 sends the target rotational speed Ne* and the target torque Te* of the engine 22 to the engine ECU 24 and the torque commands Tm1* and Tm2* of the motors MG1 and MG2 to the motor ECU 40 (Step S200) and returns to Step S100 to repeat the processing of and after Step S100. The engine ECU 24 receives the target rotational speed Ne* and the target torque Te* and performs control to obtain the target rotational speed Ne* and the target torque Te*. The motor ECU 40 receives the torque commands Tm1* and Tm2* and performs switching control of switching elements included in the respective inverters 41 and 42 so that the motor MG1 is driven in accordance with the torque command Tm1* and the motor MG2 is driven in accordance with the torque command Tm2*.

$$Tm2tmp = (Tr^* + Tm1^*/\rho)/Gr \quad (5)$$

When determining that the value of the ECO flag Feco is value "1", that is, the ECO switch 88 is turned on by the driver or the like, the CPU 72 determines whether or not the charge-discharge power demand Pb* is not less than a predetermined value Pref (relatively small positive value or value "0"), that is, whether or not the charge-discharge power demand Pb* is not less than the value Pref as electric power for discharging (Step S170). When the charge-discharge power demand Pb* is less than the predetermined value Pref and the motor MG2 is mostly driven with electric power generated by the motor MG1, the CPU 72 calculates the temporary motor torque Tm2tmp according to the above Equation (5) (Step S160) and performs processes of Step S190 and S200. On the other hand, when determining that the charge-discharge power demand Pb* is not less than the predetermined value Pref at Step S170, that is, the ECO switch 88 is turned on and the motor MG2 is mostly driven with electric power from the battery 50, the CPU 72 calculates the temporary motor torque Tm2tmp according to below Equation (6) (Step S180). The Equation (6) sets the temporary motor torque Tm2tmp to a value obtained by subtracting a torque decrease due to a reduction of electric power supplied to the motor MG2 from the battery 50 by a predetermined rate "r" in comparison with that of the turn-off condition of the ECO switch 88 from torque required for the motor MG2 that is derived from the alignment chart shown in FIG. 5. After setting the temporary torque Tm2tmp, the CPU 72 performs processes of Step S190 and S200 as in the case of the turn-off condition of the ECO switch 88 and returns to Step S100 to repeat the processing of and after Step S100. Thus, in the hybrid vehicle 20, the output torque of the motor MG2 becomes smaller than that of the turn-off condition of the ECO switch 88 when the motor MG2 is driven with electric power from the battery 50 and the ECO switch 88 is turned on, so that torque applied to the ring gear shaft or the axle becomes smaller than the torque command Tr*. Accordingly, in the hybrid vehicle 20 of the embodiment, a driving torque smaller than torque required by the driver (torque demand Tr*) may be output to the ring gear shaft 32*a* when the ECO switch 88 is turned on. However, even if the torque for driving becomes smaller than the torque demand Tr*, drivers may not complain because they may basically perform relatively careful driving when selecting the ECO mode. Preferably the above rate "r" may be determined to a value enough for prevention of complaints of drivers due to decrease of the torque for driving by experiment.

$$Tm2tmp=(Tr^*+Tm1^*/\rho-r\cdot Pb^*/Nm2)/Gr \quad (6)$$

As has been described above, when the ECO switch 88 is turned off upon driving with power from both the engine 22 and the motor MG2 in the hybrid vehicle 20 of the first embodiment, the engine 22, the motors MG1 and MG2 are controlled so that the engine 22 is operated at the target operation point (the target rotational speed Ne* and the target torque Te*) set based on the torque demand Tr* (the power demand Pe*) at Step S120 and torque equivalent to the torque demand Tr* is ensured (Steps S130-S160, S190, S200). When the ECO switch 88 is turned on upon driving with power from both the engine 22 and the motor MG2, the engine 22, the motors MG1 and MG2 are controlled so that the engine 22 is operated at the target operation point set based on the torque demand Tr* at Step S120 and the motor MG2 outputs lower power for driving in comparison with the turn-off condition of the ECO switch 88 (Steps S130-S150, S170-S200). By decreasing the power from the motor MG2 in comparison with the turn-off condition of the ECO switch 88 when the ECO mode is selected upon driving with power from both the engine 22 and the motor MG2, the torque for driving applied to the ring gear shaft 32*a* or the axle becomes slightly lower than that of the turn-off condition of the ECO switch 88, however, energy efficiency of the vehicle can be improved by reductions of electric power consumption of the motor MG2 and losses of the motor MG2, the inverter 42 and the battery 50. If decreasing the output of the engine 22 when the ECO switch 88 is turned on upon driving with power from both the engine 22 and the motor MG2, efficiency of the engine 22 may be contrarily decreased. Therefore, in the hybrid vehicle 20, a target operation point corresponding to a certain torque demand Tr* is set to a same point irrespective of operational conditions of the ECO switch 88, so that the efficiency of the engine 22 can be prevented from decreasing. Accordingly, in the hybrid vehicle 20 of the embodiment, the engine 22 and the motor MG2 are appropriately controlled so as to improve energy efficiency when the ECO mode is selected upon driving with power from both the engine 22 and the motor MG2.

Figure 6:
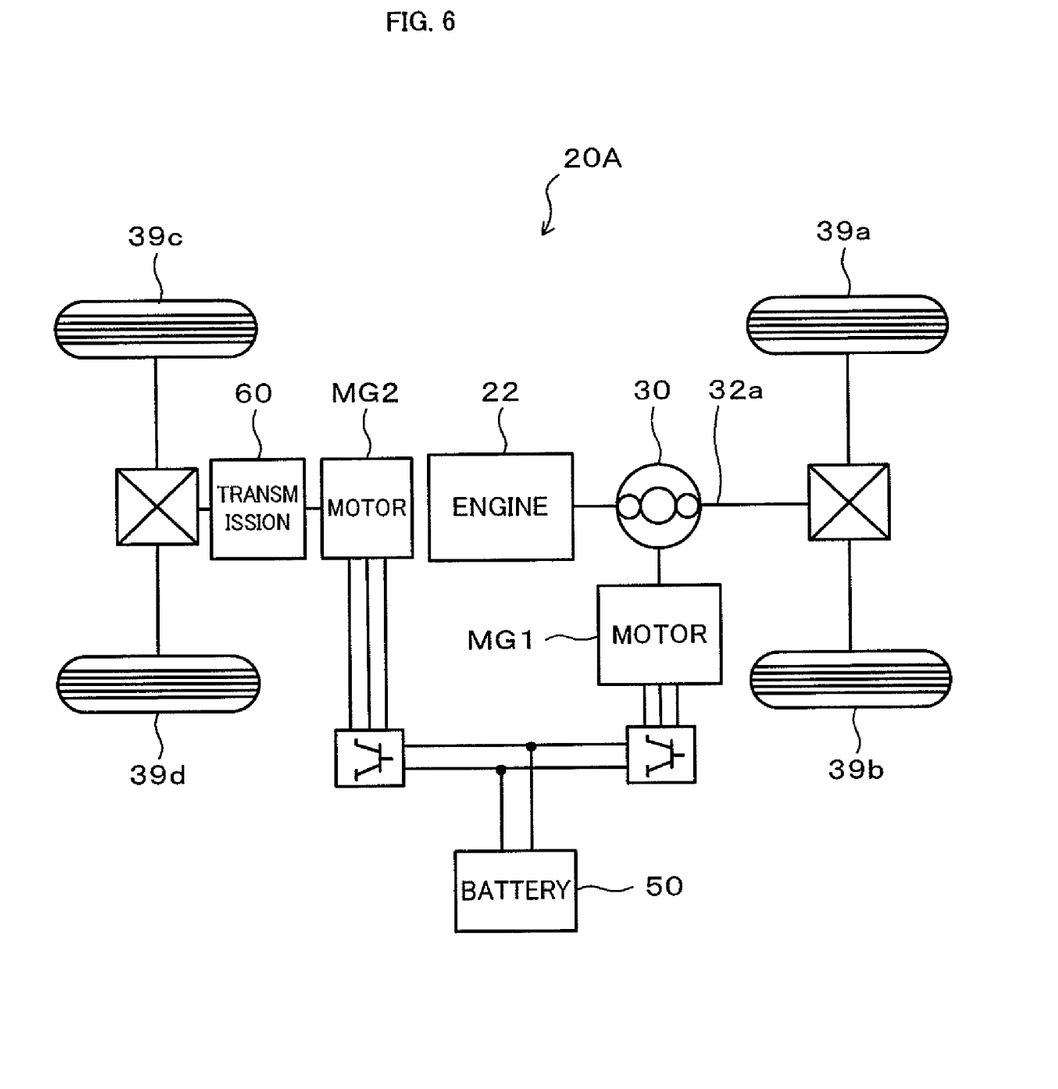
FIG. 6 is a schematic block diagram of a hybrid vehicle 20A according to a modification of the first embodiment of the present invention.
Figure 7:
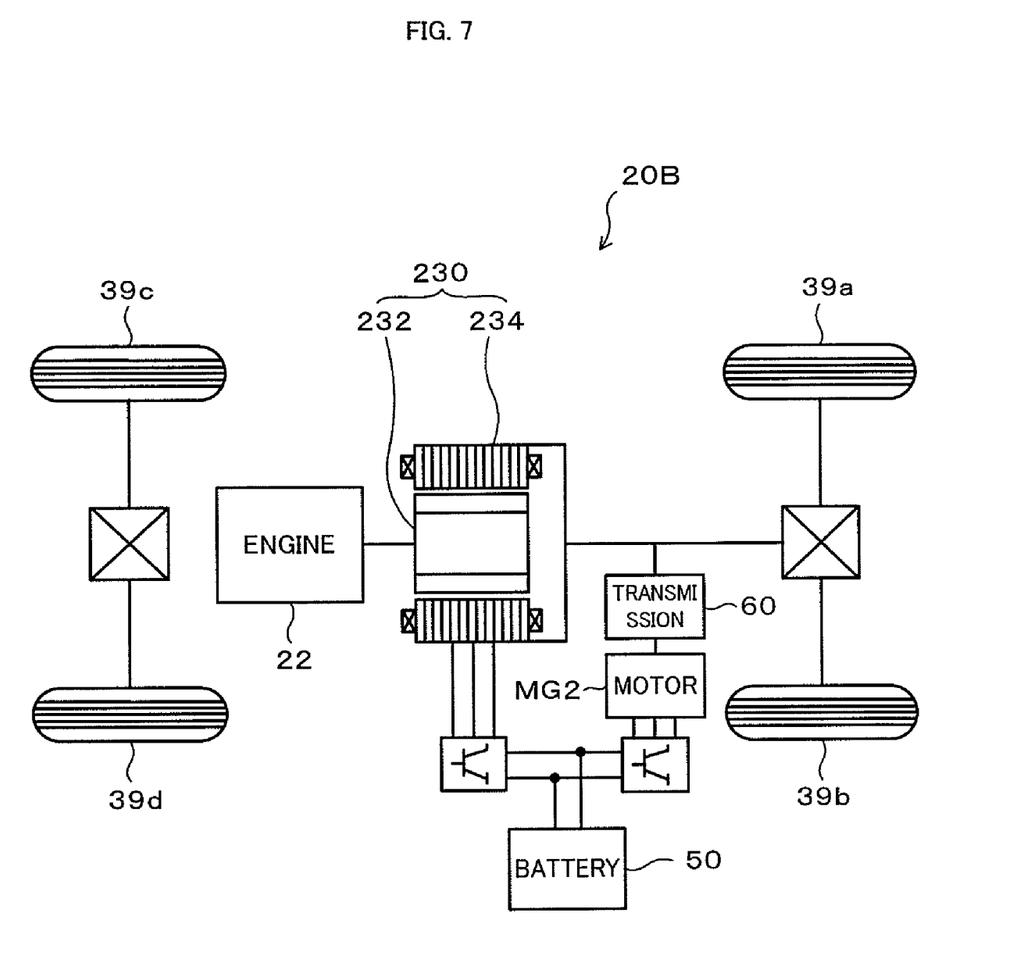
FIG. 7 is a schematic block diagram of a hybrid vehicle 20B according to a further modification of the first embodiment of the present invention.

Although the hybrid vehicle 20 of the above described embodiment is a vehicle that outputs the power of the motor MG2 to an axle connected to the ring gear shaft 32*a*, an object for application of the present invention is not limited thereto. More specifically, as in the case of a hybrid vehicle 20A as a modification example shown in FIG. 6, the present invention may also be applied to a vehicle in which the power of the motor MG2 is output to an axle (axle connected to wheels 39*c* and 39*d* in FIG. 6) that is different from the axle (axle to which the wheels 39*a* and 39*b* are connected) that is connected to the ring gear shaft 32*a*. Further, although the hybrid vehicle 20 of the above described embodiment is a vehicle that outputs the power of the engine 22 to the ring gear shaft 32*a* as an axle connected to the wheels 39*a* and 39*b* via the power distribution and integration mechanism 30, an object for application of the present invention is not limited thereto. More specifically, as in the case of a hybrid vehicle 20B as a modification example shown in FIG. 7, the present invention may also be applied to a vehicle that includes a pair-rotor motor 230 that has an inner rotor 232 connected to the crankshaft of the engine 22, and an outer rotor 234 connected to the axle that outputs the power to the wheels 39*a* and 39*b* and that transmits a part of the power output from the engine 22 to the axle while converting the remainder of the power into electric power.

Figure 8:
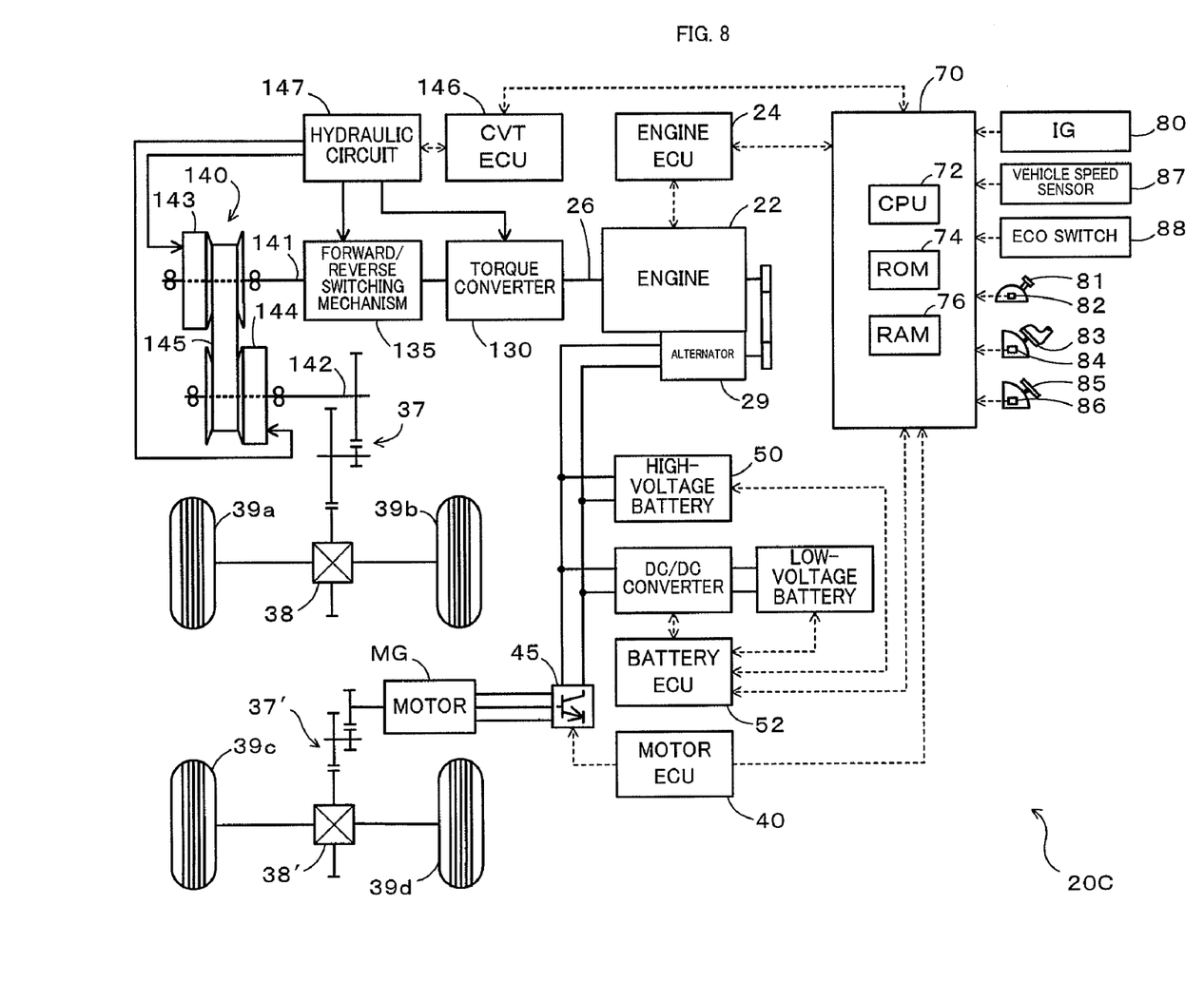
FIG. 8 is a schematic block diagram of a hybrid vehicle 20C according to a still further modification of the first embodiment of the present invention.

The present invention may also be applied to a vehicle that includes a continuously variable transmission (hereinafter, referred to as "CVT") as a power transmitting mechanism that transmits the power from the engine 22 to the axle side instead of the power distribution and integration mechanism 30 in the hybrid vehicle 20 that has the ring gear 32 as the axle-side rotational element and the carrier 34 as the engine-side rotational element. A hybrid vehicle 20C that is one example of this kind of vehicle is illustrated in FIG. 8. The hybrid vehicle 20C as a modification example shown in FIG. 8 includes a front-wheel drive system that outputs the power from the engine 22 to, for example, wheels 39*a* and 39*b* that are front wheels via a torque converter 130, a forward/reverse switching mechanism 135, a belt-type CVT 140, a gear mechanism 37, a differential gear 38, and the like, a rear-wheel drive system that outputs power from a motor MG that is a synchronous motor generator to, for example, wheels 39*c* and 39*d* that are rear wheels via a gear mechanism 37', a differential gear 38' and the like, and a hybrid ECU 70 that controls the whole vehicle. In this case, the torque converter 130 is configured as a fluid-type torque converter that has a lock-up mechanism. Further, the forward/reverse switching mechanism 135 includes, for example, a double-pinion planetary gear mechanism, a brake and a clutch. The forward/reverse switching mechanism 135 performs switching between forward and reverse movement and connection/disconnection of the torque converter 130 and the CVT 140. The CVT 140 has a primary pulley 143 capable of changing a groove width that is connected to an input shaft 141 as an engine-side rotational element, a secondary pulley 144 that is similarly capable of changing a groove width and is connected to an output shaft 142 as an axle-side rotational element, and a belt 145 that is wound around the primary pulley 143 and the secondary pulley 144. By changing the groove width of the primary pulley 143 and the secondary pulley 144 by means of hydraulic oil from a hydraulic circuit 147 that is driven and controlled by a CVT electronic control unit 146, the CVT 140 continuously changes the speed of the power input to the input shaft 141 and outputs the resulting power to the output shaft 142. Further, a toroidal-type CVT may be applied to the hybrid vehicle 20C shown in FIG. 8 instead of the belt-type CVT 140. The motor MG is connected to an alternator 29 that is driven by the engine 22 via an inverter 45, and is connected to a battery (high-voltage battery) 50 having an output terminal connected to a power line from the alternator 29. Thus, the motor MG is driven by power from the alternator 29 or the battery 50, and performs regeneration to charge the battery 50 with electric power that is generated thereby. The hybrid vehicle 20C constructed in this manner drives by outputting mainly power from the engine 22 to the wheels 39*a* and 39*b* that are front wheels in accordance with an operation of the accelerator pedal 83 by the driver, and, as necessary, drives by four-wheel driving in which, in addition to outputting the power to the wheels 39*a* and 39*b*, power from the motor MG is output to the wheels 39*c* and 39*d* that are the rear wheels.

Second Embodiment

Figure 9:
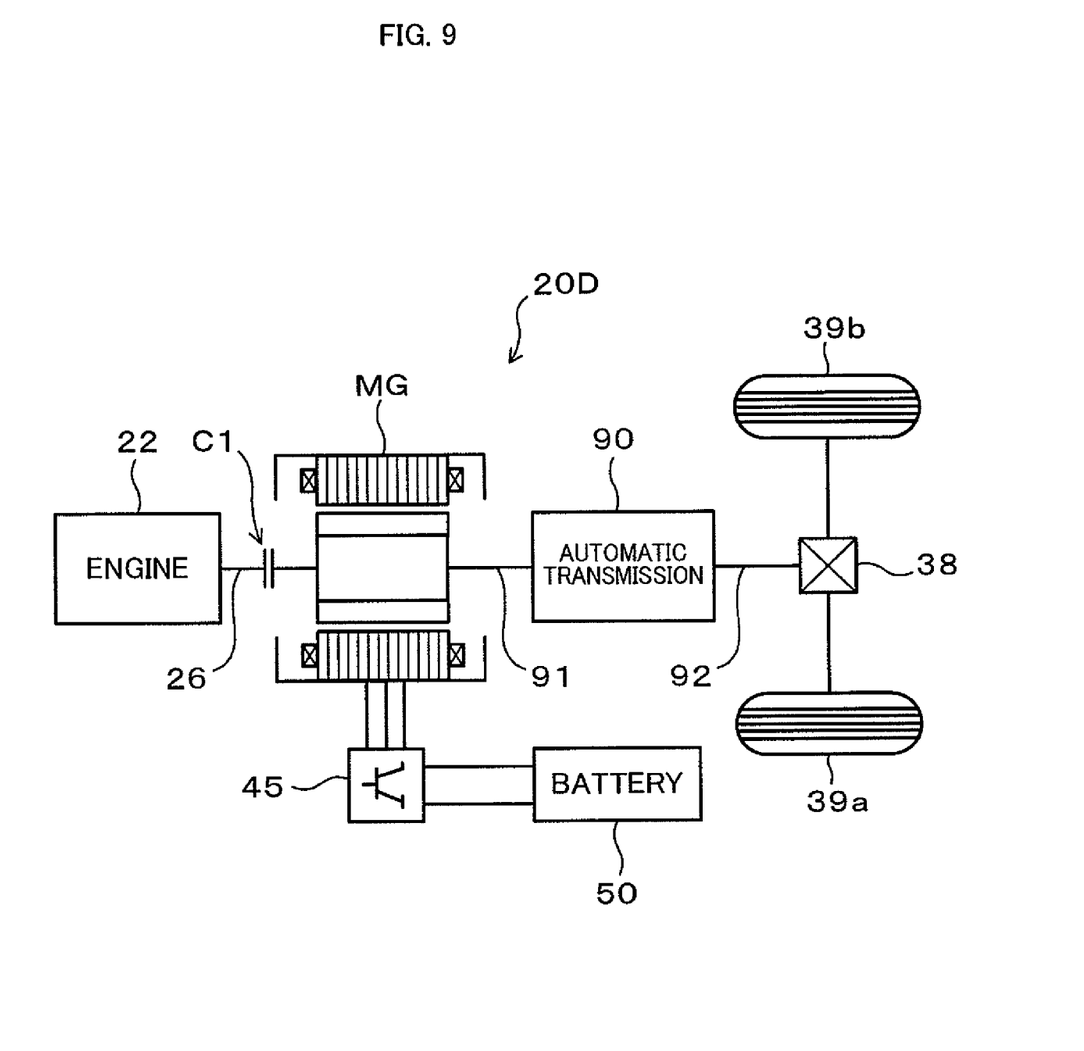
FIG. 9 is a schematic block diagram of a hybrid vehicle 20D according to a second embodiment of the present invention.

Next, a hybrid vehicle 20D according to the second embodiment of the present invention will be described with reference to FIGS. 9 and 10. Hereinafter, in order to avoid duplicate explanation, the same reference numerals or characters as those of the hybrid vehicle 20 of the first embodiment are used for the hybrid vehicle 20D of the second embodiment and the detailed explanation is omitted. FIG. 9 is a schematic block diagram of the hybrid vehicle 20D according to the second embodiment. In the hybrid vehicle 20D shown in FIG. 9, the crank shaft 26 of the engine 22 and a motor MG (rotor thereof) that is a synchronous motor are connected via a clutch C1 and the motor MG is connected to an input shaft 91 of an automatic transmission 90 that is for example a continuous type transmission. Power from an output shaft 92 of the automatic transmission 90 is transmitted through the differential gear 38 and is eventually output to wheels 39a and 39b. As the hybrid vehicle 20, the hybrid vehicle 20D also includes the ECO switch (not shown) that is turned on so as to select an ECO mode giving priority to energy efficiency such as fuel consumption over drivability. The hybrid vehicle 20D constructed in this manner basically drives by outputting mainly power from the engine 22 to the wheels 39a and 39b and drives by power from both the engine 22 and the motor MG outputting an assist torque with electric power from the battery 50 under predetermined conditions for example an acceleration driving. In the hybrid vehicle 20D according to the second embodiment, a hybrid ECU (not shown) configured to control the operations of the whole hybrid vehicle 20D executes a drive control routine shown in FIG. 10 at predetermined time intervals (for example, at ever several msec).

Figure 10:
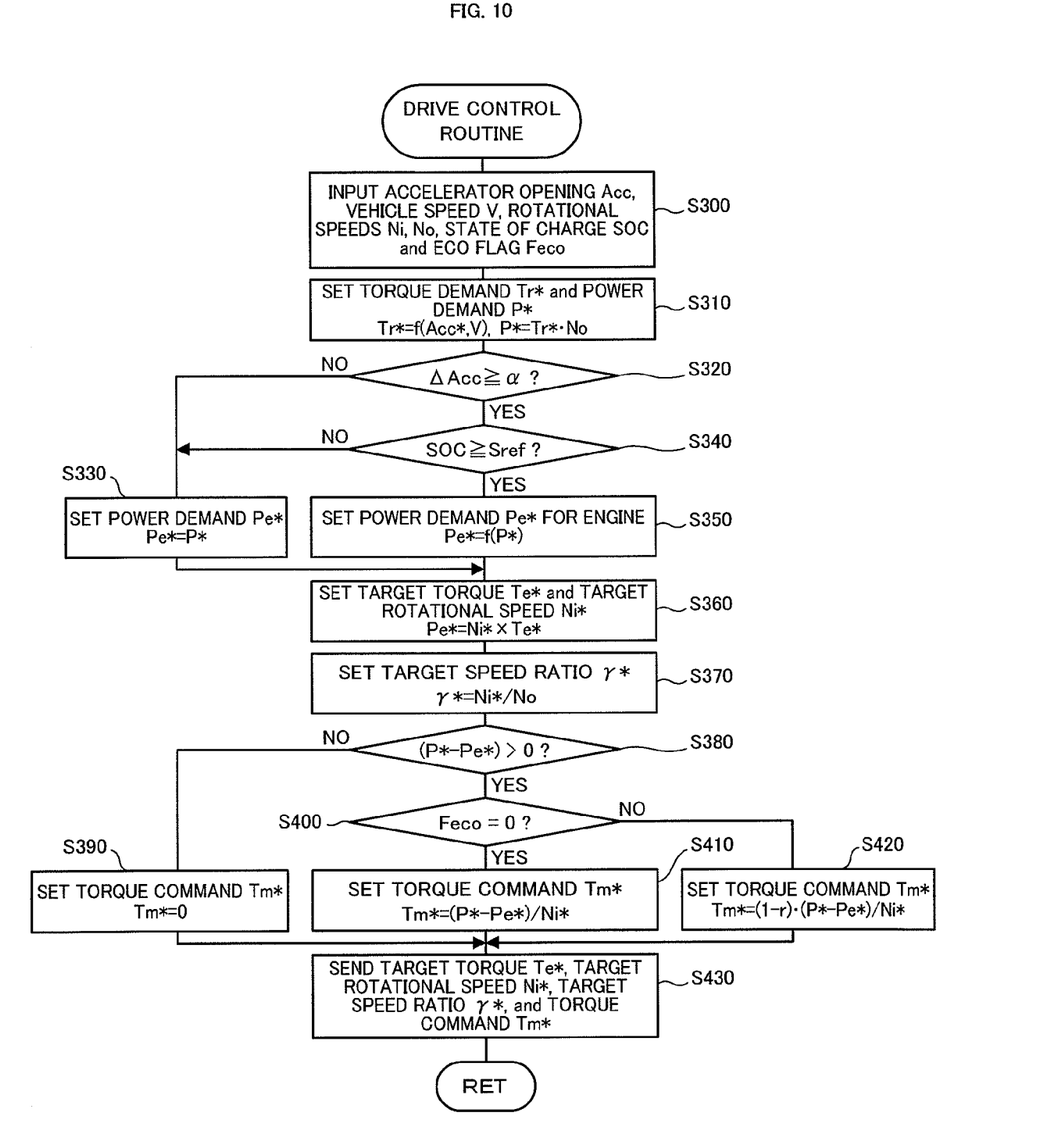
FIG. 10 is a flowchart showing an example of a drive control routine executed by a hybrid electric control unit in the second embodiment.

At start of the drive control routine in FIG. 10, the CPU (not shown) of the hybrid ECU executes input processing of data required for control such as an accelerator opening Acc, a vehicle speed V, a rotational speed Ni of the input shaft 91 of the automatic transmission 90, a rotational speed No of the output shaft 92 of the automatic transmission 90, a state of charge SOC of the battery 50 and a value of the ECO flag Feco (Step S300). The rotational speeds Ni and No are detected by a rotational position detection sensor (not shown) mounted on the input shaft 91 and a rotational position detection sensor (not shown) mounted on the output shaft 92. The state of charge SOC is transmitted from a battery ECU (not shown) controlling and managing the battery 50. After the data input at Step S300, the CPU sets a torque demand Tr* to be output to the output shaft 92 or an axle connected to wheels 39a and 39b based on the input accelerator opening Acc and the input vehicle speed V, and sets a power demand P* required for the whole of the vehicle (Step S310). In the second embodiment, the torque demand Tr* corresponding to the given accelerator opening Acc and the given vehicle speed V is also derived from a torque demand setting map previously stored in the ROM of the hybrid ECU and defining a relationship between the accelerator opening Acc, the vehicle speed V and the torque demand Tr*. In the embodiment, the power demand P* is calculated as a product of the set torque demand Tr* and a rotational speed No of the output shaft 92 input at Step S300.

Then, the CPU determines whether or not an accelerator opening deviation ΔAcc that is a deviation between the accelerator opening Acc input at Step S300 and the accelerator opening Acc at the last execution of the drive control routine shown in FIG. 10 is not less than a predetermined value a (Step S320). When the accelerator opening deviation ΔAcc is less than the predetermined value α, the CPU sets a power demand Pe* required for the engine 22 to the power demand P* set at Step S310 so that a driving power is output from only the engine 22 (Step S330). When the accelerator opening deviation ΔAcc is not less than the predetermined value α and an acceleration demand of the driver is relatively large, the CPU determines whether or not the state of charge SOC of the battery 50 input at Step S300 is not less than a predetermined value Sref (Step S340). When determining that the state of charge SOC of the battery 50 is less than the predetermined value Sref, the CPU sets the power demand Pe* required for the engine 22 to the power demand P* set at Step S310 so that the driving power is output from only the engine 22 (Step S330). On the other hand, when determining that the state of charge SOC of the battery 50 is not less than the predetermined value Sref, the CPU sets the power demand Pe* to be output by the engine 22 by executing an annealing process or a rate process based on the power demand P* set at Step S310 and a last value of the power demand P* (Step S350). That is, in the hybrid vehicle 20D, the motor MG having high responsivity outputs a supplemental power in response to an acceleration demand of the driver and the power demand Pe* is not changed abruptly in consideration of a response to the acceleration demand because the engine 22 has low responsivity to the torque command in comparison with the motor MG.

After setting the power demand Pe* at Step S330 or S350, the CPU sets a target torque Te* of the engine 22 and a target rotational speed Ni* of the input shaft 91 of the automatic transmission 90 so that the engine 22 is operated with high efficiency, based on the set power demand Pe* and a map similar to the map shown in FIG. 4 (Step S360). In the hybrid vehicle 20D according to the second embodiment, the target torque Te* and the target rotational speed Ni* indicate a target drive point of the engine 22 because the rotational speed of the input shaft 91 is same as the rotational speed of the engine 22 (crank shaft 26). After the process at Step S360, the CPU sets a target speed ratio γ* of the automatic transmission 90 to a value obtained by dividing the target rotational speed Ni* of the input shaft 91 by the rotational speed No of the output shaft 92 input at Step S300 (Step S370). Then, the CPU determines whether or not a deviation between the power demand P* for the vehicle and the power demand Pe* for the engine 22 is more than value "0" (Step S380). When the power demand Pe* is substantially equal to the power demand P*, the CPU sets a torque command Tm* for the motor MG to value "0" because there in no need to output the driving power from the motor MG (Step S390). Then, the CPU sends the target torque Te*, the target rotational speed Ni*, the target speed ratio γ*, and the torque command Tm* to an engine electronic control unit, a transmission electronic control unit, and a motor electronic control unit (neither not shown) (Step S430) and returns to Step S300 to repeat the processing of and after Step S300. When the deviation between the power demand P* for the vehicle and the power demand Pe* for the engine 22 is more than value "0", both the engine 22 and the motor MG output the driving power. In this case, the CPU determines whether or not the ECO flag Feco is value "0", that is, whether or not the ECO switch is turned off by the driver or the like (Step S400). When the ECO switch is turned off and the ECO flag Feco is value "0", the CPU sets the torque command Tm* for the motor MG to a value obtained by dividing the deviation between the power demand P* and the power demand Pe* by the target rotational speed Ni* according to below Equation (7) so that a shortage of the power demand Pe* with respect to the power demand P* is output by the motor MG (Step S410). On the other hand, when the ECO switch is turned on and the ECO flag Feco is value "1", the CPU sets the torque command Tm* for the motor MG based on below Equation (8). The Equation (8) sets the torque command Tm* to be smaller by a predetermined rate "r" than that of the turn-off condition of the ECO switch. After setting the torque commands Tm* at Step S410 or S420, the CPU sends the target torque Te*, the target rotational speed Ni*, the target speed ratio γ*, and the torque command Tm* to an engine electronic control unit, a transmission electronic control unit, and a motor electronic control unit (Step S430) and returns to Step S300 to repeat the processing of and after Step S300.

$$Tm^* = (P^* - Pe^*)/Ni^* \quad (7)$$

$$Tm^* = (1-r) \cdot (P^* - Pe^*)/Ni^* \quad (8)$$

As has been described above, the present invention may be applied to the hybrid vehicle 20D that includes the engine 22 and the motor MG exclusively driven with electric power from the battery 50 and is capable of driving with power from the engine 22 and the motor MG. That is, by decreasing the power from the motor MG in comparison with the turn-off condition of the ECO switch when the ECO mode is selected upon driving with power from both the engine 22 and the motor MG in the hybrid vehicle 20D, the torque for driving applied to the output shaft 92 or the axle becomes slightly lower than that of the turn-off condition of the ECO switch, however, energy efficiency of the vehicle can be improved by reductions of electric power consumption of the motor MG and losses of the motor MG, the inverter 45 and the battery 50 and by preventing the efficiency of the engine 22 from decreasing. A drive control routine similar to the routine shown in FIG. 10 may be applied to the hybrid vehicle 20C shown in FIG. 8 including CVT 140 so as to accelerate the vehicle with power from the engine 22 and motor MG driven with electric power from the battery 50.

The correlation between the principal elements of the embodiments and modification examples, and the principal elements of the invention described in the "Disclosure of the Invention" section will now be described. That is, in the above described embodiment and modification examples, the engine 22 capable of outputting power to the ring gear shaft 32a and the like corresponds to "internal combustion engine", the motors MG, MG2, and the pair-rotor motor 230 correspond to "motor", the battery 50 corresponds to "accumulator", the ECO switch 88 to select the ECO mode corresponds to "efficiency priority mode selection switch", and the hybrid ECU 70 and the like executing the drive control routine shown in FIG. 2 or FIG. 10 corresponds to "driving force demand setting module", "target operation point setting module" and "control module". Further, the power distribution integration mechanism 30 including the ring gear 32 as the axle-side rotational element and the carrier 34 as the engine-side rotational element, and the CVT 140 including the input shaft 141 as the engine-side rotational element and the output shaft 142 as the axle-side rotational element correspond to "power transmitting mechanism", a combination of the motor MG1 and the power distribution integration mechanism 30, and the pair-rotor motor 230 correspond to "electric power-mechanical power input output structure", the motor MG1, the alternator 29 and the pair-rotor motor 230 correspond to "power generation motor", and the power distribution integration mechanism 30 corresponds to "three shaft-type power input output assembly". In any case, the correspondence between the main elements in the embodiment and the variant and the main elements in the invention described in "Disclosure of the Invention" do not limit the elements in the invention described in "Disclosure of the Invention" since the embodiment is an example for describing in detail the best mode for carrying out the invention described in "Disclosure of the Invention". Specifically, the embodiment is merely a detailed example of the invention described in "Disclosure of the Invention", and the invention described in "Disclosure of the Invention" should be construed on the basis of the description therein.

Hereinbefore, the embodiments of the present invention have been described with reference to drawings, however, the present invention is not limited to the above embodiments. It will be apparent that various modifications can be made to the present invention without departing from the spirit and scope of the present invention.

INDUSTRIAL APPLICABILITY

The technique of the invention is preferably applied to the manufacturing industries of hybrid vehicles.

The invention claimed is:

1. A hybrid vehicle comprising:
an internal combustion engine capable of outputting power for driving;
a motor capable of outputting power for driving;
an accumulator capable of supplying and receiving electric power from the motor;
an efficiency priority mode selection switch to select an efficiency priority mode that gives priority to energy efficiency;
a driving force demand setting module configured to set a driving force demand required for driving the hybrid vehicle;
a target operation point setting module configured to set a target operation point of the internal combustion engine based on the set driving force demand; and
a control module configured to control the internal combustion engine and the motor so that the internal combustion engine is operated at the set target operation point and a driving power equivalent to the set driving force demand is ensured when the efficiency priority mode selection switch is turned off upon driving with power from both the internal combustion engine and the motor, the control module controlling the internal combustion engine and the motor so that the internal combustion engine is operated at the set target operation point and the motor outputs lower power for driving in comparison with a turn-off condition of the efficiency priority mode selection switch when the efficiency priority mode selection switch is turned on upon driving with power from both the internal combustion engine and the motor,
wherein the control module sets a torque command value for the motor to be smaller by a predetermined amount than that of the turn-off condition of the efficiency priority mode selection switch when the efficiency priority mode selection switch is turned on upon driving with power from both the internal combustion engine and the motor.

2. A hybrid vehicle comprising:
an internal combustion engine capable of outputting power for driving;
a motor capable of outputting power for driving;
an accumulator capable of supplying and receiving electric power from the motor;
an efficiency priority mode selection switch to select an efficiency priority mode that gives priority to energy efficiency;
a driving force demand setting module configured to set a driving force demand required for driving the hybrid vehicle;

a target operation point setting module configured to set a target operation point of the internal combustion engine based on the set driving force demand;

a control module configured to control the internal combustion engine and the motor so that the internal combustion engine is operated at the set target operation point and a driving power equivalent to the set driving force demand is ensured when the efficiency priority mode selection switch is turned off upon driving with power from both the internal combustion engine and the motor, the control module controlling the internal combustion engine and the motor so that the internal combustion engine is operated at the set target operation point and the motor outputs lower power for driving in comparison with a turn-off condition of the efficiency priority mode selection switch when the efficiency priority mode selection switch is turned on upon driving with power from both the internal combustion engine and the motor; and a power transmitting mechanism having an axle-side rotational element connected to a predetermined axle, and an engine-side rotational element connected to an engine shaft of the internal combustion engine and configured to differentially rotate with respect to the axle-side rotational element, the power transmitting mechanism capable of outputting at least a part of power from the engine shaft to the axle side.

3. A hybrid vehicle according to claim 2, wherein the power transmitting mechanism is an electric power-mechanical power input output structure connected to the predetermined axle and the engine shaft of the internal combustion engine and outputting at least a part of power from the internal combustion engine to the axle side with input/output of electric power and mechanical power, the electric power-mechanical power input output structure supplying and receiving electric power from the accumulator.

4. A hybrid vehicle according to claim 3, wherein the electric power-mechanical power input output structure includes a power generation motor capable of inputting and outputting power, and a three shaft-type power input output assembly connected with three shafts, the predetermined axle, the engine shaft of the internal combustion engine, and a rotating shaft of the power generation motor, the three shaft-type power input output assembly configured to input and output power to one remaining shaft, based on input and output of powers from and to any two shafts selected among the three shafts.

5. A hybrid vehicle according to claim 4, wherein the control module sets a torque command value for the motor so that electric power supplied to the motor from the accumulator becomes smaller by a predetermined rate than that of the turn-off condition of the efficiency priority mode selection switch when the efficiency priority mode selection switch is turned on upon driving with power from both the internal combustion engine and the motor.

6. A hybrid vehicle according to claim 2, wherein the power transmitting mechanism is a continuously variable transmission.

7. A control method of a hybrid vehicle including an internal combustion engine capable of outputting power for driving, a motor capable of outputting power for driving, an accumulator capable of supplying and receiving electric power from the motor, and an efficiency priority mode selection switch to select an efficiency priority mode that gives priority to energy efficiency, the method comprising the steps of:

(a) setting a target operation point of the internal combustion engine based on a driving force demand required for driving the hybrid vehicle; and (b) controlling the internal combustion engine and the motor so that the internal combustion engine is operated at the target operation point set at the step (a) and a driving power equivalent to the set driving force demand is ensured when the efficiency priority mode selection switch is turned off upon driving with power from both the internal combustion engine and the motor, and controlling the internal combustion engine and the motor so that the internal combustion engine is operated at the target operation point set at the step (a) and the motor outputs lower power for driving in comparison with a turn-off condition of the efficiency priority mode selection switch when the efficiency priority mode selection switch is turned on upon driving with power from both the internal combustion engine and the motor, wherein the step (b) sets a torque command value for the motor to be smaller by a predetermined amount than that of the turn-off condition of the efficiency priority mode selection switch when the efficiency priority mode selection switch is turned on upon driving with power from both the internal combustion engine and the motor.

8. A control method of a hybrid vehicle including an internal combustion engine capable of outputting power for driving, a motor capable of outputting power for driving, an accumulator capable of supplying and receiving electric power from the motor, and an efficiency priority mode selection switch to select an efficiency priority mode that gives priority to energy efficiency, the method comprising the steps of:

(a) setting a target operation point of the internal combustion engine based on a driving force demand required for driving the hybrid vehicle; and (b) controlling the internal combustion engine and the motor so that the internal combustion engine is operated at the target operation point set at the step (a) and a driving power equivalent to the set driving force demand is ensured when the efficiency priority mode selection switch is turned off upon driving with power from both the internal combustion engine and the motor, and controlling the internal combustion engine and the motor so that the internal combustion engine is operated at the target operation point set at the step (a) and the motor outputs lower power for driving in comparison with a turn-off condition of the efficiency priority mode selection switch when the efficiency priority mode selection switch is turned on upon driving with power from both the internal combustion engine and the motor, wherein the hybrid vehicle further includes a power transmitting mechanism having an axle-side rotational element connected to a predetermined axle, and an engine-side rotational element connected to an engine shaft of the internal combustion engine and configured to differentially rotate with respect to the axle-side rotational element, the power transmitting mechanism capable of outputting at least a part of power from the engine shaft to the axle side.

9. A control method of a hybrid vehicle according to claim 8, wherein the power transmitting mechanism is an electric power-mechanical power input output structure connected to the predetermined axle and the engine shaft of the internal combustion engine and outputting at least a part of power from the internal combustion engine to the axle side with input/output of electric power and mechanical power, the electric power-mechanical power input output structure supplying and receiving electric power from the accumulator.

10. A control method of a hybrid vehicle according to claim 9, wherein the electric power-mechanical power input output structure includes a power generation motor capable of inputting and outputting power, and a three shaft-type power input output assembly connected with three shafts, the predetermined axle, the engine shaft of the internal combustion engine, and a rotating shaft of the power generation motor, the three shaft-type power input output assembly configured to input and output power to one remaining shaft, based on input and output of powers from and to any two shafts selected among the three shafts.

11. A control method of a hybrid vehicle according to claim 10, wherein the step (b) sets a torque command value for the motor so that electric power supplied to the motor from the accumulator becomes smaller by a predetermined rate than that of the turn-off condition of the efficiency priority mode selection switch when the efficiency priority mode selection switch is turned on upon driving with power from both the internal combustion engine and the motor.

12. A control method of a vehicle according to claim 9, wherein the power transmitting mechanism is a continuously variable transmission.

* * * * *